US006191808B1

(12) United States Patent
Katayama et al.

(10) Patent No.: US 6,191,808 B1
(45) Date of Patent: *Feb. 20, 2001

(54) IMAGE PROCESSING METHOD WITH VIEWPOINT COMPENSATION AND APPARATUS THEREFOR

(75) Inventors: Akihiro Katayama, Yokosuka; Koichiro Tanaka, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/769,884

(22) Filed: Dec. 19, 1996

Related U.S. Application Data

(63) Continuation of application No. 08/285,231, filed on Aug. 3, 1994.

(30) Foreign Application Priority Data

Aug. 4, 1993 (JP) ........ 5-193737
Oct. 29, 1993 (JP) ........ 5-271698

(51) Int. Cl.[7] ........ H04N 7/18

(52) U.S. Cl. ........ 348/39; 348/36; 348/42

(58) Field of Search ........ 348/39, 36, 42, 348/46; 395/125

(56) References Cited

U.S. PATENT DOCUMENTS 5,101,268 * 3/1992 Ohba ........ 348/39
5,130,794 * 7/1992 Ritchey ........ 348/39
5,193,000 * 3/1993 Lipton et al. ........ 348/46
5,287,437 * 2/1994 Deering ........ 348/46
5,422,563 * 6/1995 Maguire, Jr. ........ 345/9
5,495,576 * 2/1996 Ritchey ........ 395/125

FOREIGN PATENT DOCUMENTS 2256567 12/1992 (GB) .
WO9008343 7/1990 (WO) .

OTHER PUBLICATIONS

Rowley, Terry, *"Virtuality" Entertainment Systems,* Proc. Conf. Computer Graphics (1990), pp. 19–28.

Devarajan, Dr. Venkat and Hooks, John T. Jr., *Low Altitude High Speed Flight Simulation Using Video Disc Technology,* LTV Aerospace and Defense Company (Jul. 25, 1985), pp. 54–65.

* cited by examiner

*Primary Examiner*—Andy Rao
(74) *Attorney, Agent, or Firm*—Morgan & Finnegan, LLP

(57) ABSTRACT

There are provided a multi-viewpoint image database for holding images from a plurality of different viewpoints, a viewpoint detector for detecting a position of the observer's viewpoint, and a viewpoint parameter calculating portion for obtaining a viewpoint parameter from an output from the viewpoint detector. Further, a pixel value producing portion is provided for calculating a parameter necessary for reconstruction of image from the type of display screen and the viewpoint parameter, calculating with the parameter to which pixel in the images in the multi-viewpoint image database each pixel in a reconstructed image corresponds, and extracting corresponding pixels from the multi-viewpoint image database.

22 Claims, 14 Drawing Sheets

|   | 1 | 2 | 3 | 4 | 5 | 6 | 7 | 8 | 9 | 10 |   | nx |
|---|---|---|---|---|---|---|---|---|---|---|---|---|
| 1 |   |   |   |   | a2 | b2 |   |   |   | c1 | ... |   |
| 2 |   |   |   | a2 | b2 |   | c1 |   |   |   | ... |   |
| 3 |   |   | a2 | c1 |   |   |   |   |   |   | ... |   |
| 4 | c1 | a2 | b2 |   |   |   |   |   |   |   | ... |   |

INTERPOLATION LINE ; 1-2
INTERPOLATION LINE ; 2-2
INTERPOLATION LINE ; 3-2
INTERPOLATION LINE ; 4-2
INTERPOLATION LINE ; 5-2
INTERPOLATION LINE ; 6-2
INTERPOLATION LINE ; 7-2

INTERPOLATION LINE ; j-2

INTERPOLATION LINE; ny-2

FIG. 9

| | 1 | 2 | 3 | 4 | 5 | 6 | 7 | 8 | 9 | 10 | | $n_x$ | |
|---|---|---|---|---|---|---|---|---|---|---|---|---|---|
| 1 | | | | | a2 | b2 | | | | c1 | • • • | | |
| 2 | | | | | a | b | | | c | | • • • | | ← INTERPOLATION LINE ; j-2 |
| 3 | | | | a | b | | | c | | | • • • | | ← INTERPOLATION LINE ; j-3 |
| 4 | | | | a2 | b2 | | c1 | | | | • • • | | |
| 5 | | | | a | b | c | | | | | • • • | | ← INTERPOLATION LINE ; j-5 |
| 6 | | | a | b | c | | | | | | • • • | | ← INTERPOLATION LINE ; j-6 |
| 7 | | | a2 | c1 | | | | | | | • • • | | |
| 8 | | | c | b | | | | | | | • • • | | ← INTERPOLATION LINE ; j-8 |
| 9 | | c | b | | | | | | | | • • • | | ← INTERPOLATION LINE ; j-9 |
| 10 | c1 | a2 | b2 | | | | | | | | • • • | | |

IMAGE PROCESSING METHOD WITH VIEWPOINT COMPENSATION AND APPARATUS THEREFOR

This is a continuation of co-pending application Ser. No. 08/285,231 , filed on Aug. 3, 1994.

BACKGROUND OF THE INVENTION

1. Field of the Invention

The present invention relates to an image processing method and an image processing apparatus, in which a plurality of images are taken in at different viewpoints to provide an image to be observed at a position of a viewpoint corresponding to a present position of the eyes of an observer.

2. Related Background Art

There are stereo displays and lenticular displays known as conventional apparatus for stereoscopically displaying images seen from a plurality of viewpoints. In the stereo displays, video images from two cameras are alternately switched at high speed to be displayed, so that an observer can stereoscopically observe the video images using shutter glasses or polarization glasses synchronized with the switching. Further, the lenticular displays are arranged as follows. For example, let A, B, C, D be images from four cameras and A (1,1) be a pixel position (1,1) in A. The images A, B, C, D from the cameras are arranged in the pixel unit (x,y) in order on a liquid crystal display 191, as shown in FIG. 24A. A lenticular sheet 192 is attached to the front face, as shown in FIG. 24B. As so arranged, the video images from four viewpoints can be stereoscopically expressed (Papers C, Institute of Electrical Engineers of Japan, Vol. 112 No. 5, 1992, PP281–282; Japanese Laid-open Patent Application No. 3-269680).

SUMMARY OF THE INVENTION

Using the conventional stereo displays as described above, the observer can, however, observe only stereoscopic images seen in the taking directions of the cameras at the time of photo-taking of the images. Because two cameras are generally fixed to take pictures of an object, the same image is observed by the observer even if the observer changes the viewpoint (the position of the eyes), raising a problem of lack of presence, i.e., not reflecting the movement of the observer's viewpoint. Although the lenticular displays can respond to the horizontal movement of the position of the observer's viewpoint, the observer can observe an image taken by either one of the cameras, among intermittent images taken by a plurality of cameras. Thus, the lenticular displays are not ready for continuous movement of the viewpoint nor for back-and-forth movement of the viewpoint. The back-and-forth movement of the viewpoint can be dealt with in case of stereoscopic view based on images produced by computer graphics. This is, however, possible under such special circumstances that the images handled by the computer graphics are simple and all corresponding coordinate values in a three-dimensional space are known for points in the images. For stereoscopically viewing the images taken by the cameras, it is the case that the back-and-forth movement of the viewpoint has little been studied.

An object of the present invention is to provide an image processing method and an image processing apparatus which, with the position of the observer's eyes moving in any direction, possibly back and forth, can provide images as observed at moving positions in real time.

An image processing method of the present invention comprises a multi-viewpoint image inputting step for taking in a plurality of images from viewpoints at mutually different positions, as multi-viewpoint image data, a viewpoint detecting step for detecting a position of observer's eyes, an image reconstructing step for reconstructing, based on the position detected in the viewpoint detecting step, an image from a viewpoint at the position from the multi-viewpoint image data, and an image outputting step for outputting the reconstructed image to an image outputting device.

An image processing apparatus of the present invention comprises a multi-viewpoint image inputting unit for taking in a plurality of images from viewpoints at mutually different positions as multi-viewpoint image data, a viewpoint detecting unit for detecting a position of observer's eyes, an image reconstructing unit for reconstructing, based on the position detected by the viewpoint detecting unit, an image from a viewpoint at the position from the multi-viewpoint image data, and an image outputting unit for outputting the reconstructed image to an image outputting device.

In the above arrangement, the position of the observer's eyes is detected and an image to be observed by the observer is reconstructed from a plurality of images, whereby with movement of the observer's viewpoint an image reflecting the motion can be supplied in a smooth manner.

The multi-viewpoint image data composed of a plurality of images different in the position of viewpoint may be a number of images obtained by one or more cameras or a number of images stored in a database. In order to reconstruct an image, the multi-viewpoint image data preferably includes images taken at sufficiently fine intervals of the photo-taking position. However, even if the intervals of the taking position are coarse, an image can be reconstructed by performing an interpolation process for taken images to produce an image at a position of a viewpoint between two adjacent taking positions and using multi-viewpoint image data including the taken images and thus produced images.

The reconstruction of an image is carried out as follows. Parameters necessary for the image reconstruction are calculated from the position of the observer's eyes and the type of image output device. Calculated based on the thus obtained parameters is to which pixel in the images in the multi-viewpoint image data each pixel in an image to be reconstructed corresponds. Corresponding pixels are extracted from the multi-viewpoint image data to reconstruct an image. In this case, even if the position of the observer's eyes is not coincident with a position of viewpoint of any image in the multi-viewpoint image data, correspondence between pixels can be attained, which thus permits an image to be well reconstructed.

The image output device may be selected from stereo displays, head-mounted displays, and lenticular displays as well as the ordinary displays.

Another object of the present invention is to provide an image processing method and apparatus which can produce images of N viewpoints from images taken by M image pickup devices (cameras) (M<N) to permit the observer to move the viewpoint in a smooth manner.

An image processing method of the present invention is further characterized by provision of:

- an image inputting step for taking in images taken from a plurality of viewpoints;
- a corresponding point detecting step for detecting corresponding points between the input images; and
- an image interpolating step for performing interpolation using the input images and detected corresponding points to produce an image from a viewpoint different from the viewpoints of the input images.

The image inputting step may be a step of taking in images from a plurality of cameras or a step of taking in images from an image database.

Corresponding points between input images can be detected on an epipolar plane, and then the detection of corresponding points can be replaced by linear detection on the epipolar plane.

The interpolation of an image is preferably performed every epipolar plane of input images.

An image processing apparatus of the present invention is further characterized by provision of:

- an image inputting unit for taking in images taken from a plurality of viewpoints;
- a corresponding point detecting unit for detecting corresponding points between the input images; and
- an image interpolating unit for performing interpolation using the input images and detected corresponding points to produce an image from a viewpoint different from the viewpoints of the input images.

The image input means may be one which can take in images from a plurality of cameras or one which can take in images from an image database.

Corresponding points between input images can be obtained by linear detection on an epipolar plane.

The interpolation of an image is preferably performed every epipolar plane of the input images.

The present invention employs the above arrangement to interpolate images obtained from a plurality of viewpoints to produce an image observed at a viewpoint different from those of the input images.

By interpolating the images obtained from a plurality of viewpoints and producing images as observed from viewpoints different from those of the input images, the present invention permits images from more viewpoints than those of the input images to be attained. Thus, the observer can smoothly move the viewpoint while the image is stereoscopically displayed. Further, such an increase in the number of viewpoints can improve reality of a stereoscopic image displayed. Since the number of input image pickup devices (cameras) can be decreased, the apparatus can be constructed in a compact size.

Further, the present invention can be applied to production of interpolation images between multi-viewpoint images (images taken while finely shifting the viewpoint) stored in a database or the like, and the images can be displayed on a lenticular display or a holographic display of more viewpoints. This enables us to obtain a stereoscopic image with more reality and the observer can move the viewpoint in a smooth manner because of the increase of the number of viewpoints.

BRIEF DESCRIPTION OF THE DRAWINGS

FIG. 9 is a drawing to illustrate the interpolation algorithm;

DETAILED DESCRIPTION OF THE PREFERRED EMBODIMENTS

Figure 1:
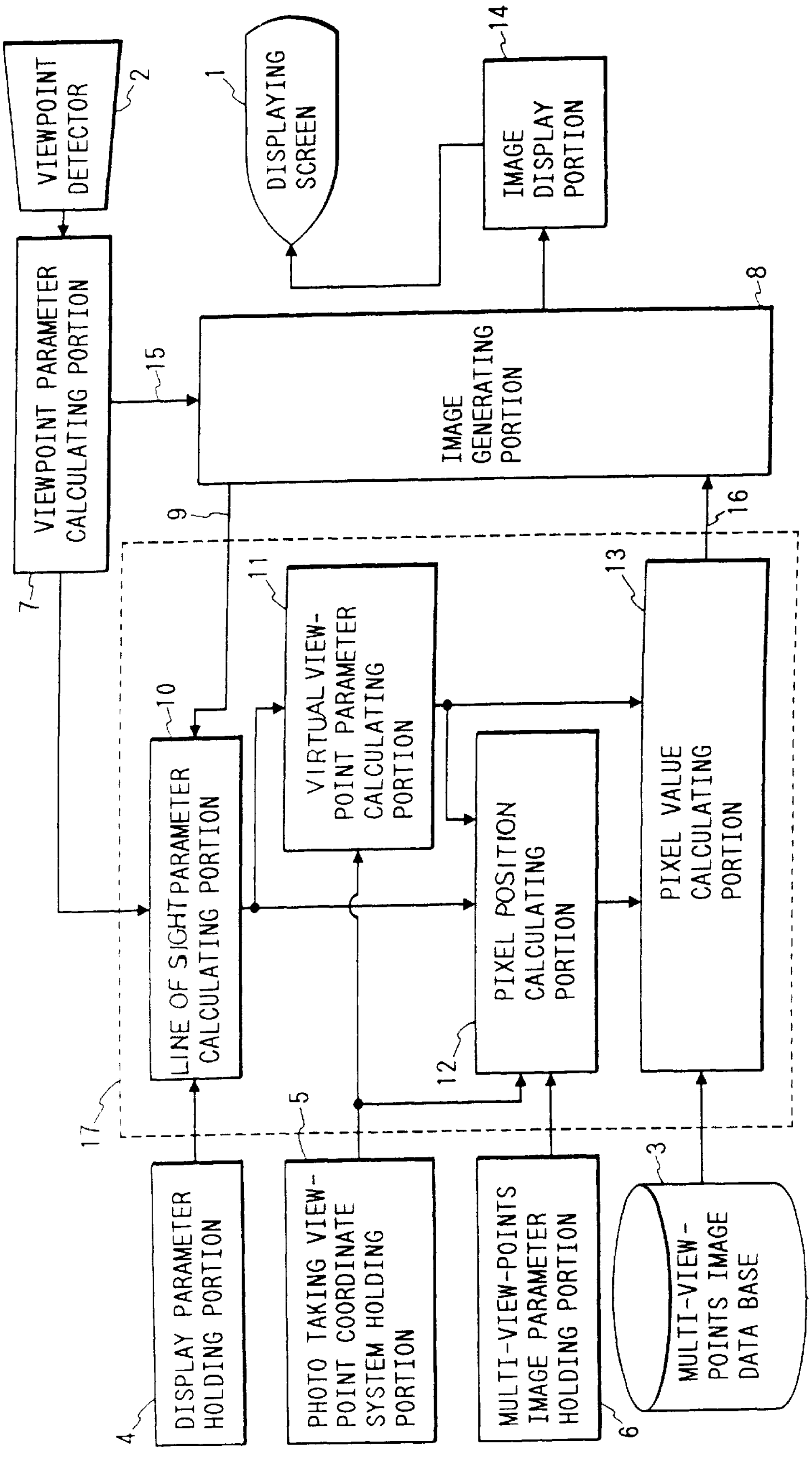
FIG. 1 is a block diagram to show an embodiment of an image processing apparatus of the present invention.

FIG. 1 is a block diagram to show the structure of an image processing apparatus as the first embodiment of the present invention. The image processing apparatus is for displaying an image reconstructed in a below-described manner for a user (observer) through a display screen 1 set in a stationary state. In detail, the image processing apparatus is composed of a viewpoint detector 2 for detecting a position of the user's eyes watching the display screen 1, a multi-viewpoint image database 3 which is a database holding multi-viewpoint image data, a display parameter holding portion 4 for holding a display parameter concerning the display screen 1, a photo-taking viewpoint coordinate system holding portion 5 for storing data of a coordinate system of a photo-taking position for each image in the multi-viewpoint image database 3, a multi-viewpoint image parameter holding portion 6 for holding image parameters of images in the multi-viewpoint image database 3, a viewpoint parameter calculating portion 7 for calculating a viewpoint parameter based on a signal from the viewpoint detector 2 and outputting an updating signal 15 when the user changes the position of the viewpoint, an image generating portion 8 for generating an image according to the viewpoint of the user, an image display portion 14 for displaying the image generated by the image generating portion 8 on the display screen, and a pixel value generating portion 17 for calculating pixel values for reconstructing an image to output them as a pixel value signal 16 to the image generating portion 8.

The images in the multi-viewpoint image database 3 are images of an object to be displayed, taken from a multitude of viewpoints aligned at sufficiently fine intervals on a plane. Corresponding to it, the data held in the photo-taking viewpoint coordinate system holding portion 5 is data on the coordinate system indicating the plane of the alignment of the viewpoints used for the photo-taking of the images. Further, the image generating portion 8 is arranged to generate an image when it receives an updating signal 15. The image generating portion 8 outputs a pixel index signal 9 indicating coordinates of a pixel of interest in the image as reconstructed, i.e., in the image on the display screen 1. In reconstructing an image, pixel index signals 9 are output in turn throughout all pixels in the image to be reconstructed.

The structure of the pixel value generating portion 17 is next described. The pixel value generating portion 17 is constructed of a visual-axis parameter calculating portion 10 for calculating a direction of the line of sight to a pixel indicated by the pixel index signal 9, from the viewpoint parameter and display parameter, a virtual viewpoint parameter calculating portion 11 for calculating a virtual viewpoint, a pixel position calculating portion 12 for calculating a position of a pixel to meet the direction of the line of sight in the image at the virtual viewpoint, and a pixel value calculating portion 13 for calculating a corresponding pixel value from the images in the multi-viewpoint image database 3, based on the pixel position and virtual viewpoint parameter. Here, the virtual viewpoint is an intersection between the line of sight indicated by the visual-axis parameter and the plane of the alignment of the photo-taking viewpoint indicated by the photo-taking viewpoint coordinate system. The visual-axis parameter, photo-taking viewpoint coordinate system, virtual viewpoint parameter, and multi-viewpoint image parameter are used to calculate the pixel position in the pixel position calculating portion 12. A pixel value calculated in the pixel value calculating portion 13 becomes a pixel value signal 16.

The operation of the present embodiment is next described. Outline of the operation is first explained.

When the user watching the display screen 1 changes the position of the head so as to move the viewpoint, the signal output from the viewpoint detector 2 changes and then the viewpoint parameter calculating portion 7 receives the change to supply an updating signal 15 to the image generating portion 8. When the image generating portion 8 receives the updating signal 15, it starts generating a new image reflecting the movement of the viewpoint. The generation of new image is performed in such a manner that the image generating portion 8 outputs pixel index signals 9 in turn for all pixels and obtains pixel value signals 16 for the pixels from the pixel value generating portion 17, in turn. Now, the operation of the pixel value generating portion 17 is described.

In the pixel value generating portion 17, the visual-axis parameter calculating portion 10 captures the viewpoint parameter from the viewpoint parameter calculating portion 7 and the display parameter from the display parameter holding portion 4 to calculate a visual-axis parameter corresponding to a pixel index signal 9 input. Then the virtual viewpoint parameter calculating portion 11 captures the photo-taking viewpoint coordinate system from the photo-taking viewpoint coordinate system holding portion 5 to calculate a virtual viewpoint parameter indicating an intersection (virtual viewpoint) between the line of sight indicated by the visual-axis parameter and the plane of the alignment of the photo-taking viewpoints indicated by the photo-taking viewpoint coordinate system. The pixel position calculating portion 12 captures the multi-viewpoint image parameter from the multi-viewpoint image parameter holding portion 6 and calculates a position of a pixel meeting the direction of the line of sight in the image at the virtual viewpoint from the visual-axis parameter, the photo-taking viewpoint coordinate system, and the virtual viewpoint parameter in addition to the multi-viewpoint image parameter. Then the pixel value calculating portion 13 calculates a corresponding pixel value signal 16 from the images in the multi-viewpoint image database 3, based on the pixel position and the virtual viewpoint parameter. As described, the pixel value generating portion 17 calculates a pixel value signal 16 for each input pixel index signal 9 and outputs it to the image generating portion 8.

After the image generating portion 8 obtains pixel value signals 16 for all pixels from the pixel value calculating portion 13, it supplies the signals to the image display portion 14. The image display portion 14 indicates the thus produced image reflecting the new viewpoint on the display screen 1. This concludes the serial image generating operation executed with movement of the user's viewpoint. As will be apparent from the below description, when the user moves the viewpoint back and forth, up and down, or left and right, and, as a result, even if the viewpoint is located at a place other than the viewpoints where the images stored in the multi-viewpoint image database 3 were taken, the user can observe an image of the object reflecting the movement of the viewpoint through the display screen 1.

The processes will be described in detail one by one. For simplicity of description, there is no vertical parallax but only a horizontal parallax considered in the following description.

Figure 2:
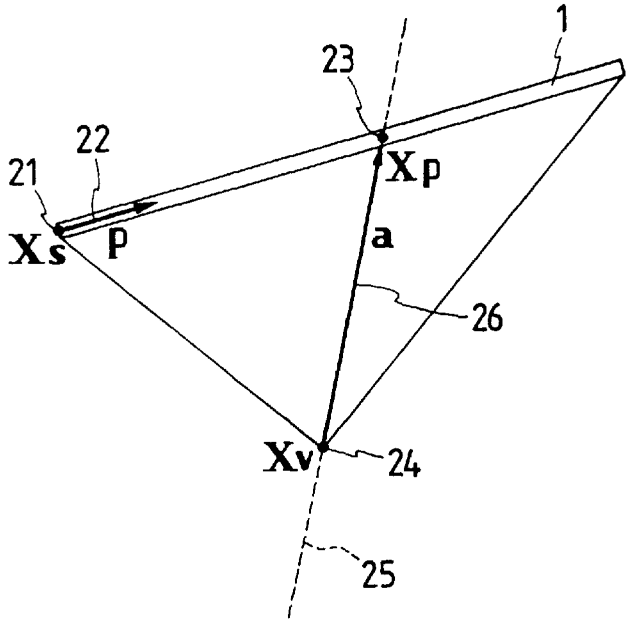
FIG. 2 is a drawing to show the principle of calculation of a visual-axis parameter in the embodiment of FIG. 1.
Figure 3:
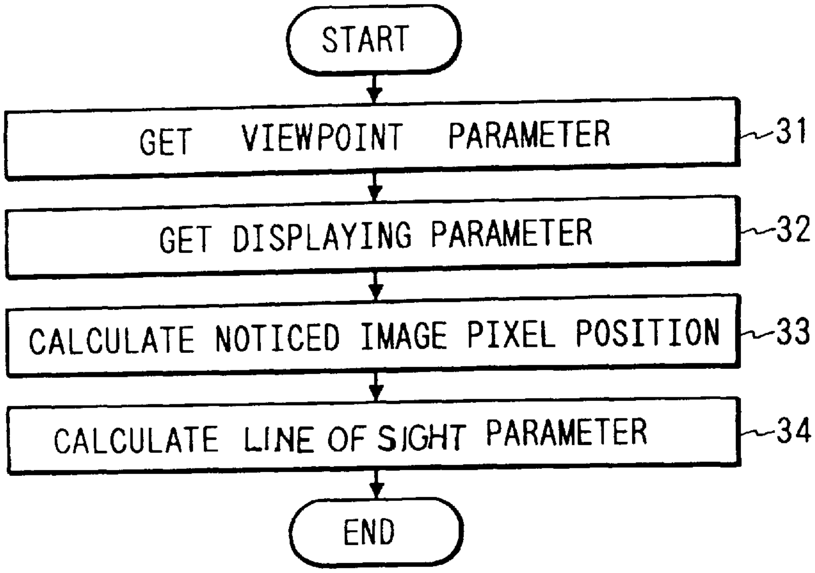
FIG. 3 is a flowchart to show a process in a visual-axis parameter calculating portion.

First described is the process for calculating the visual-axis parameter in the visual-axis parameter calculating portion 10. FIG. 2 is a drawing to show the principle of calculation in the visual-axis parameter calculating portion 10, and FIG. 3 a flowchart to show the process in the visual-axis parameter calculating portion 10.

In FIG. 2, let Xs, Xp, Xv be position vectors of the end point 21 of the display screen 1, a pixel position 23 of a pixel of interest on the display screen 1, and a position 24 of the user's viewpoint, respectively. A vector 22 is a vector with the length being the pixel pitch of display screen 1 and the direction being an inclination of display screen 1, which is defined as a display screen vector p. The line of sight 25 hits the pixel position 23 of interest, and a vector 26 indicating an inclination of the line of sight 25 is defined as a visual-axis vector a.

The calculating portion 10 first captures the viewpoint parameter from the viewpoint parameter calculating portion 7 (step 31). The viewpoint parameter is the position 24 of the user's viewpoint in FIG. 2. The calculating portion 10 also captures the display parameter from the display parameter holding portion 4 (step 32). The display parameter is the end point 21 of display screen 1, indicated by the display screen vector 22. The display screen vector 22 is determined by the inclination, the real size, and the pixel size of display screen 1. Based on the positional relation shown in FIG. 2, the calculating portion 10 calculates the pixel position 23 of interest on the display screen 1 by the following formula (1) in accordance with the pixel index signal 9 (step 33). Here, the pixel index signal 9 is defined by i.

$$Xp = Xs + i \cdot p \tag{1}$$

Obtaining the pixel position 23, the calculating portion 10 then obtains a visual-axis parameter corresponding to the direction of the pixel position 23 as observed from the viewpoint position 24 (step 34), and ends the process for obtaining the visual-axis parameter. The visual-axis parameter is expressed by a combination of the viewpoint position 24 and the visual-axis vector 26, (Xv,a). Since the line of sight 25 is a straight line passing through two points of the pixel position 23 and the viewpoint position 24, the visual-axis vector 26 can be calculated by the following formula (2).

$$a=Xp-Xv \qquad (2)$$

Figure 4:
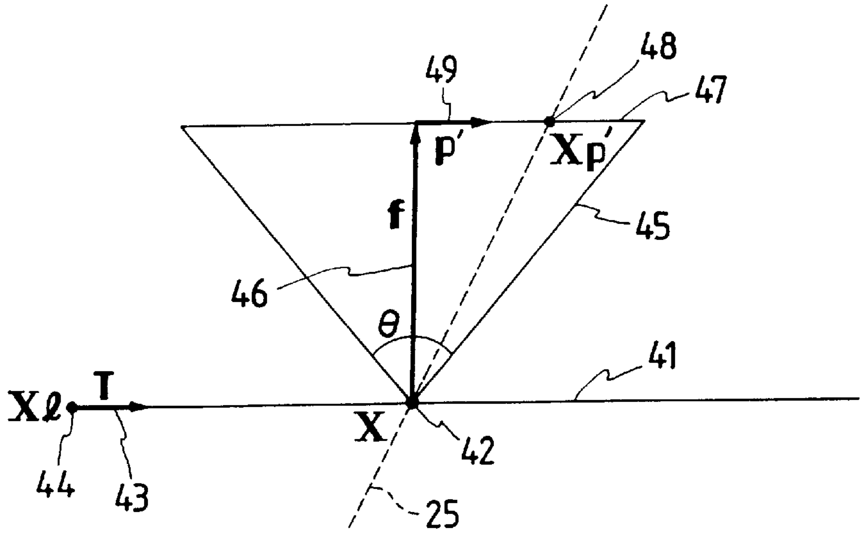
FIG. 4 is a drawing to show the principle of calculation of virtual viewpoint parameter and pixel position in the embodiment of FIG. 1.

Next described are the processes in the virtual viewpoint parameter calculating portion 11 and the pixel position calculating portion 12. FIG. 4 is a drawing to show the principle of calculation of the virtual viewpoint parameter and the pixel position.

As described previously, the viewpoints at the photo-taking moment of the images in the multi-viewpoint image database 3 are aligned on a same plane. A cross section of the plane of the alignment is indicated as a viewpoint alignment line 41 in the drawing. The virtual viewpoint 42 is expressed as an intersection between the line of sight 25 and the viewpoint alignment line 41, a position vector of which is a virtual viewpoint position vector X. Also, a vector 43 indicating the inclination of viewpoint alignment line 41 is defined as a virtual-point alignment vector T, and a position vector of the end point 44 of the viewpoint alignment line 41 as Xl. A visual field 45 represents the angle of field of view e at the virtual viewpoint 42, and a vector 46 is a focus vector f with the length being a focal length of the cameras having taken the images in the multi-viewpoint data and the direction being an inclination of the cameras. Further defined are a virtual pickup plane 47 at the virtual viewpoint 42 and a pixel position 48 as an intersection between the virtual pickup plane 47 and the line of sight 25. A position vector of the pixel position 48 is expressed by Xp'. A vector 49 is a pickup plane vector p' with the length being one pixel pitch of the virtual pickup plane 47 and the direction being the inclination of the virtual pickup plane 47 (normally making right angles with the focus vector 46).

Here, the photo-taking viewpoint coordinate system holing portion 5 holds the viewpoint alignment vector 43 and the end point 44 of the viewpoint alignment line 41 as values indicating the photo-taking viewpoint coordinate system. Also, the multi-viewpoint image parameter holding portion 6 holds the focus vector 46 and the pickup plane vector 49 as the multi-viewpoint image parameter. The magnitude of the pickup plane vector 49 is equal to the cell size (the length of a pixel) of an actual image pickup plane.

Using the points and vectors as described above, the virtual viewpoint 42 is expressed by the following formulas (3) and (4).

$$X=Xl+t\cdot T \qquad (3)$$

$$X=Xv+\alpha\cdot a \qquad (4)$$

Here, t is a virtual viewpoint parameter, which is a parameter uniquely expressing the virtual viewpoint. In the formula (4) α is a coefficient in the direction of the line of sight. The virtual viewpoint parameter calculating portion 11 calculates t by solving the formulas (3) and (4) and then obtains X.

Further, the pixel position 48 is expressed by the following formulas (5) and (6).

$$Xp'=X+f+i'\cdot p' \qquad (5)$$

$$Xp=X+\beta\cdot a \qquad (6)$$

Here, i' is a pixel position parameter, which is a parameter uniquely expressing the pixel position 48. In the formula (6) β is a coefficient in the direction of the line of sight. The pixel position calculating portion 12 calculates the pixel position parameter i' by solving the formulas (5) and (6), and outputs it.

The process of the pixel value calculating portion 13 is specifically described in the following. In the present embodiment, the multi-viewpoint images held in the multi-viewpoint image database 3 are images having been taken at sufficiently fine viewpoint intervals. First, an image taken at a viewpoint nearest to the virtual viewpoint 42 is picked up from the images in the multi-viewpoint image database 3, as an approximate image to an image to be taken from the virtual viewpoint 42 indicated by the virtual viewpoint parameter calculated in the virtual viewpoint parameter calculating portion 11. Among the picked-up image a value of a pixel closest to the pixel position 48 calculated in the pixel position calculating portion 12 is selected and the selected value is output as the pixel value signal 16.

Although the above description concerned the processes in the portions omitting the vertical parallax for simplicity of description, with multi-viewpoint images in the vertical direction the same method can be employed to achieve a binocular stereoscopic display apparatus which permits back-and-forth, up-and-down, or left-and-right movement of the viewpoint, taking the vertical parallax into consideration. The binocular stereoscopic display apparatus permitting the back-and-forth, up-and-down, or left-and-right movement of the viewpoint can be constructed as follows. The display screen 1 and the image display portion 8 are a stereoscopic display screen and a stereoscopic image display portion permitting binocular stereoscopic view, such as the lenticular type or the glasses type. Further, the viewpoint parameter calculating portion 7 calculates viewpoint parameters for positions of the left and right eyes and, corresponding thereto, the image generating portion 8 generates respective images to be presented to the left and right eyes.

Next described is an image processing apparatus which can freely display an image for moving viewpoint even if the intervals of viewpoints are not so fine for the images stored in the multi-viewpoint image database 3. The image processing apparatus is arranged to include an inter-viewpoint interpolation processing portion between the multi-viewpoint image database 3 and the pixel value calculating portion 13 in the image processing apparatus of the first embodiment as described above. The inter-viewpoint interpolation processing portion produces a group of images at sufficiently fine intervals of viewpoint by an interpolation process using the images in the multi-viewpoint image database 3, which have been taken at coarse intervals of viewpoints. Using the thus obtained images at sufficiently fine intervals between viewpoints, an image matching with a change of the user's viewpoint can be produced in the same manner as in the first embodiment.

The inter-viewpoint interpolation processing portion is described in detail in the following. Here, the vertical parallax is not taken into consideration for simplicity of description. The multi-viewpoint image database 3 holds images from respective photo-taking viewpoints aligned on a horizontal straight line.

Figure 5:
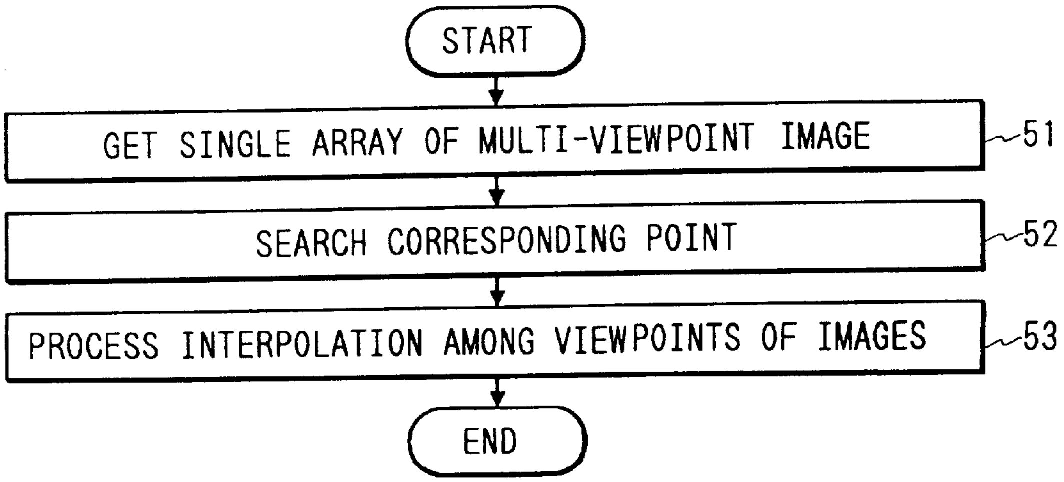
FIG. 5 is a flowchart to show a flow of a process in an inter-viewpoint interpolation processing portion in the image processing apparatus of the present invention.

FIG. 5 is a flowchart to show a flow of the process in the inter-viewpoint interpolation processing portion. The interpolating portion captures the images having been taken at coarse intervals of viewpoint from the multi-viewpoint image database 3 (step 51). Next, a corresponding point search (motion vector detection) is carried out between the captured images (step 52). After completion of the corresponding point search, an interpolation process is carried out based on the photo-taking viewpoints to produce images at sufficiently fine intervals between the viewpoints (step 53), and the process is ended.

Figure 6:
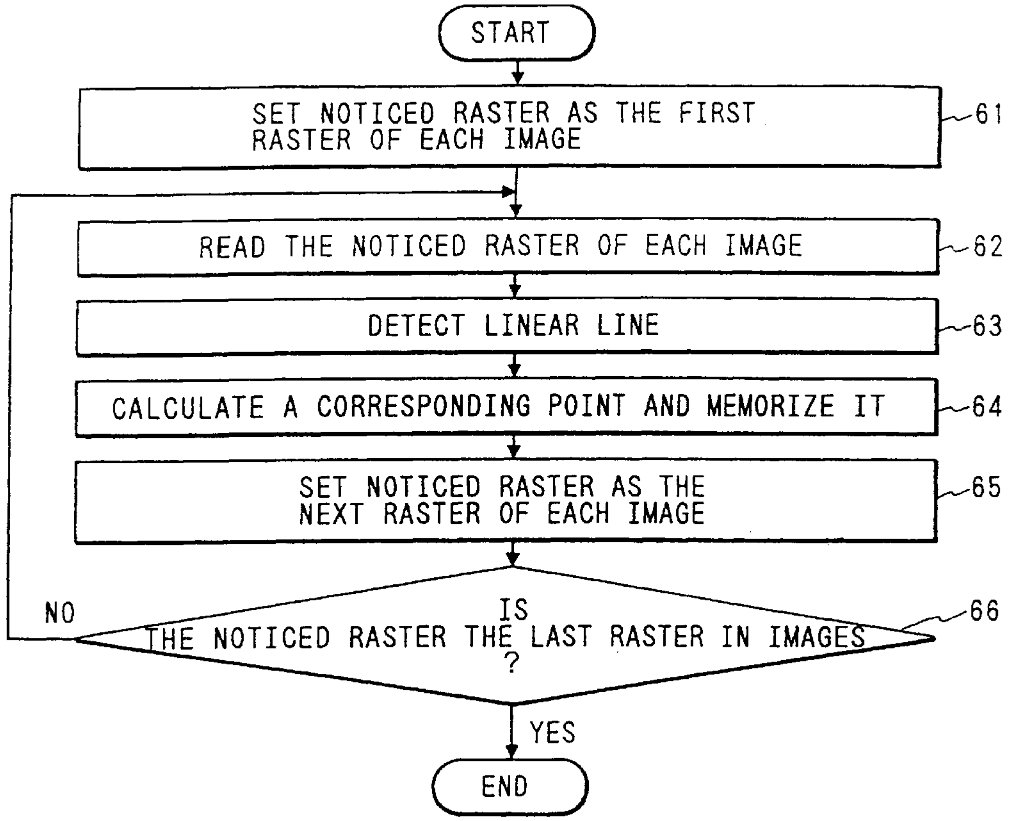
FIG. 6 is a flowchart to show a corresponding point searching process.

The corresponding point search is first described referring to the flowchart of FIG. 6.

Figure 7:
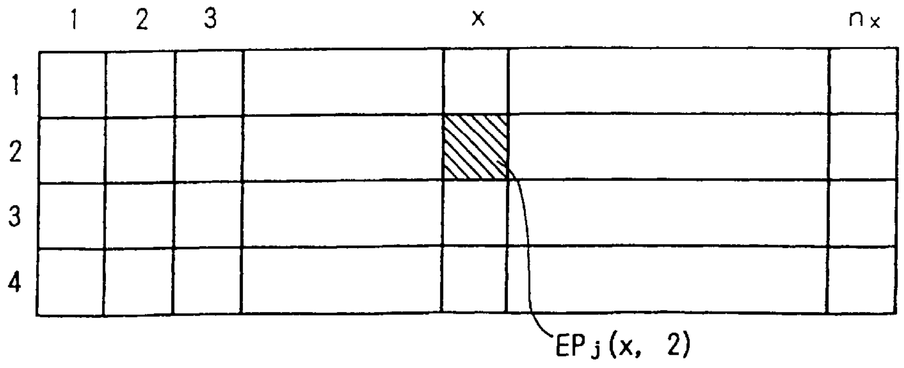
FIG. 7 is a drawing to show the j-th epipolar plane.

For the initial setting, a raster of interest is set to a first raster of each image (step 61). Then the raster of interest of each image is read into a working memory (not shown) (step 62) to constitute a first virtual epipolar plane. Here, the j-th epipolar plane is a set of points $EP_j(x,i)$ satisfying the following formula, on the image plane as shown in FIG. 7:

$$EP_j(x,i)=N_i(x,j).$$

In the formula, $N_i(x,j)$ is an x-th pixel value in the j-th line of the i-th image (where i=1 to 4), which represents a value of a pixel in the i-th image having coordinates of (x,j). If image input devices such as cameras are aligned at equal intervals, all corresponding points are to be aligned on a straight line on the epipolar plane. Accordingly, interpolation of images can be made on this straight line.

Then a line including corresponding points is extracted (step 63), and corresponding points are calculated from the obtained line and then are stored (step 64). A specific corresponding point calculation algorithm is next described.

Procedure A1: For $EP_j(x,1)$ as pixels of interest, all m's satisfying the following relation are obtained within the range of $m=k_1$ to $k_1+k_2$.

$$\sum_{i=2}^{4}\{EP_j(x+m\times(i-1),i)-EP_j(x,1)\}^2<TH2$$

Here, TH2 is a threshold value for finding corresponding points, which is set to 1200 ($=3\times20^2$). Also, $k_1$ is a value depending upon the photo-taking method of input images. If the photo-taking is carried out using cameras arranged at equal intervals and with parallel optical axes, $k_1=0$. Further, $k_2$ is a value determined by the camera intervals and a distance to an object, which is set to 20 in this example (assuming no movement exceeds 20 pixels).

Procedure A2: For all x's where x=1 to $n_x$, the procedure A1 is repeated, storing all values of m corresponding to the values of x. Here, $n_x$ represents the number of pixels in the main scanning direction on an image. If $EP_j(x+m\times(i-1),i)$ is absent, it is judged that no corresponding point exists for the m, and the process is continued Procedure A3: A corresponding point with priority 1 is obtained from a line with inclination m obtained by the procedures A1 and A2, and is stored in a memory. If a plurality of corresponding points are attained, all are stored as corresponding points with priority 1 for convenience. Pixels determined as corresponding points are determined as processed pixels.

Procedure A4: Considering the procedures A1 to A3 as a cycle, the above cycle is repeated for unprocessed pixels. If $EP_j(x+m\times(i-1),i)$ is already processed in the procedure A1, the process is continued setting $EP_j(x+m\times(i-1),i)-EP_j(x,1)=0$. If in the procedure A3 a corresponding point obtained from the line with inclination m is already processed, this point is excluded from the corresponding point. A corresponding point obtained in the n-th cycle is stored as a corresponding point with priority n.

Procedure A5: If the number of unprocessed pixels does not decrease after the process of procedure A4, the procedures A1 to A4 are executed for $EP_j(x,2)$ as pixels of interest. Here, x=1 to $n_x$.

Procedure A6: If the number of unprocessed pixels does not decrease after the process of procedure A5, the procedures A1 to A4 are executed for $EP_j(x,3)$ as pixels of interest. Here, x=1 to $n_x$.

Procedure A7: The procedures A1 to A4 are repeated in the same manner while increasing the value of j one by one.

Procedure A8: If the above processes are executed up to last rasters, the corresponding point search process is ended.

Executing the above processes, corresponding points, which could not be attained from two images, can be detected and occlusion can be effectively dealt with, thus improving the accuracy of corresponding point search.

Next described is the inter-viewpoint interpolation process of images (step 53 in FIG. 5). This interpolation process is carried out for corresponding points obtained by the above corresponding point search process. A specific algorithm of the interpolation process is described referring to an example of FIG. 8.

Figure 8:
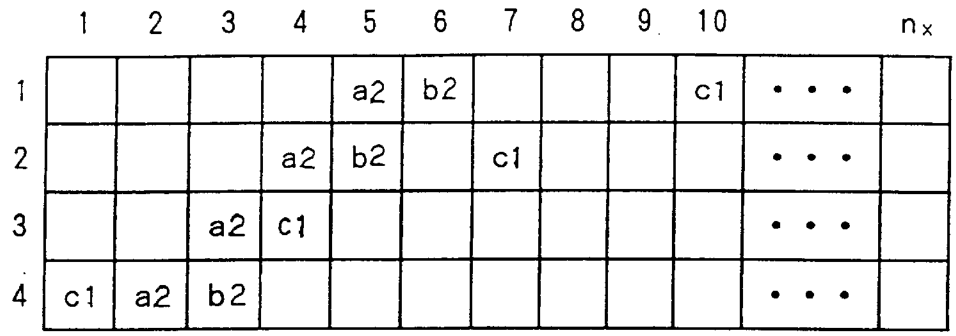
FIG. 8 is a drawing to illustrate an interpolation algorithm.

FIG. 8 shows the j-th epipolar plane. In FIG. 8, c1 represent corresponding points with priority 1 and a2, b2 corresponding points with priority 2. Let us consider a case where n images are generated at equal intervals between two input images. Here, assume n=2 for simplicity of description. Considering this with the j-th epipolar plane, as shown in FIG. 9, two lines are interpolated between two lines in the epipolar plane (i.e., epipolar lines j-2, j-3, j-5, j-6, j-8, j-9), and a value of a pixel in an interpolated line existing on a line connecting two corresponding points on the original epipolar plane is set to an average value of pixel values for the corresponding points. Namely, the following procedures are executed.

Procedure B1: Considering a line connecting corresponding points with priority 1, a value of a pixel in an interpolation line on the line is set to an average value of pixel values in the original image existing on the line. In case of the example of corresponding point c1 in FIG. 9, pixel values of point c1 on the line connecting the corresponding points are determined as average values of pixel values represented by c1.

Procedure B2: After completion of the process for corresponding points with priority 1, the process is next executed for corresponding points with priority 2. This process is basically the same as the procedure B1, but the process is not carried out for pixels already interpolated in the procedure B1. This is explained using FIG. 9. Pixels (3,8) and (2,9) are normally interpolated by corresponding points a2, but they are already interpolated by the corresponding points of c1 with priority 1. Therefore, no process is carried out for these pixels at all. Then pixels interpolated by the corresponding points a2 are four pixels of (5,2), (4,3), (4,5), (3,6). (In the example of FIG. 9, occlusion occurs in this portion, and the issue of occlusion can be dealt with in the above process.)

Procedure B3: After completion of the process for the corresponding points with priority 2, the process is next carried out for corresponding points with priority 3. Similarly as in the procedure B2, no process is executed for already interpolated pixels. Then the process is repeated in the same manner up to corresponding points with final priority.

Procedure B4: Pixels not interpolated after completion of procedures B1 to B3 are interpolated from neighboring pixels. The method of the interpolation may be a method using an average value of neighboring pixel values or a method using a value of a nearest pixel as is.

Figure 10:
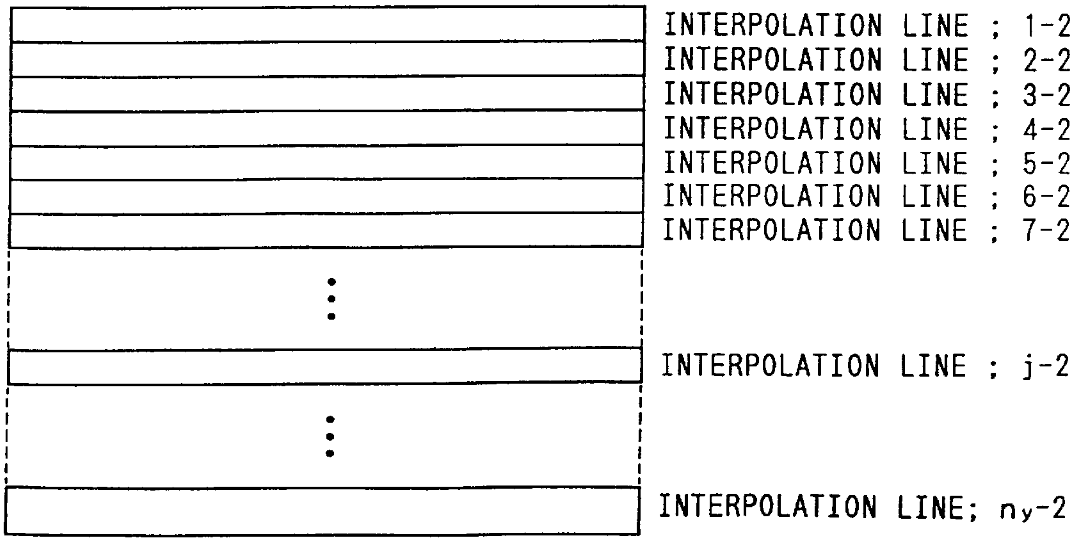
FIG. 10 is a drawing to illustrate the interpolation algorithm.

Procedure B5: The processes of procedures B1 to B4 are executed for j=1 to $n_y$, obtaining interpolation images using the interpolation lines j-2, j-3, j-5, j-6, j-8, j-9. For example, an interpolation image #2 shown in FIG. 10 can be constructed by arranging the interpolation lines j-2 (j=1 to $n_y$) in order. Another interpolation image #3, #5, #6, #8, or #9 can be constructed in the same manner.

Producing the inter-viewpoint interpolation images from the images in the multi-viewpoint image database 3 as described above, images from other viewpoints than the photo-taking viewpoints are obtained on the line of alignment of the photo-taking viewpoints. This can produce an image from an arbitrary viewpoint. Accordingly, the multi-viewpoint image database 3 does not have to store multi-viewpoint images at sufficiently fine intervals of viewpoints, which is advantageous in considerably reducing the memory capacity for the multi-viewpoint image database 3.

Although the above description concerned the case where the vertical parallax was omitted, an image taking the vertical parallax into consideration can also be produced as follows. Images taken from respective photo-taking viewpoints at coarse viewpoint intervals in a grid pattern on a plane are stored in the multi-viewpoint image database 3. First, images are interpolated in the horizontal direction between the viewpoints, and then interpolated in the vertical direction between the viewpoints.

Producing interpolation images from a multitude of input images using the above-described arrangement and method, corresponding points, which could not be obtained from two images, can be detected, which improves the accuracy of interpolation. Since the corresponding points are obtained from a multitude of images, the issue of occlusion can be well dealt with as described previously.

Next described is another example of the image processing apparatus having the interpolation processing portion.

Figure 11:
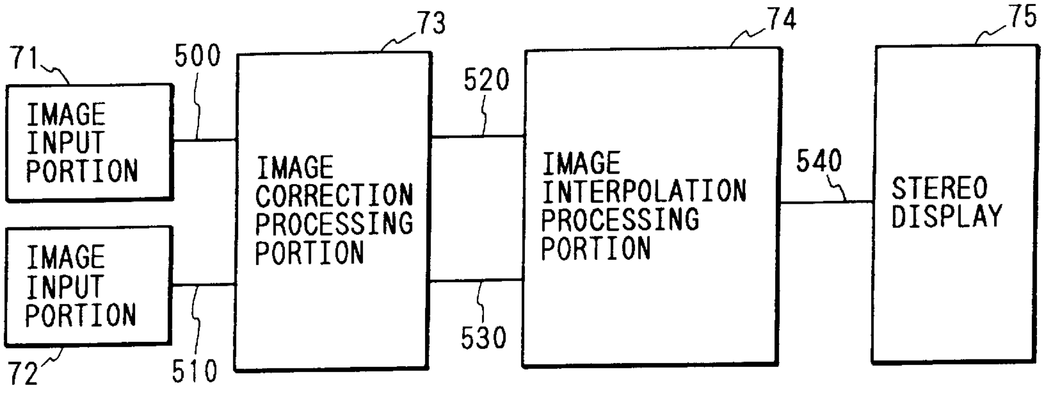
FIG. 11 is a block diagram of another embodiment of the present invention.

In FIG. 11, 71 and 72 are image input portions for taking in respective images, 73 an image correcting portion for correcting the input images, 74 an image interpolation processing portion for producing images from viewpoints different from those of image input portions 71, 72, from the two corrected images by the interpolation, and 75 an image display portion for displaying the input images from the image input portions 71, 72 and the images produced by the image interpolation processing portion 74. The image input portions 71 and 72 each are constructed of an image input device such as the SV camera or the TV camera. The input images from the image input portions 71 and 72 are supplied to the image correcting portion 73. The image correcting portion 73 performs geometric correction processes for correcting chromatic aberrations and distortions of lenses, a deviation of the optical axis, and the posture and position of cameras, and correction processes for correcting sensitivity unevenness of CCD sensors. The correction processes can be executed at high speed referring to a table which is recorded in ROM or RAM including corrected data after calibration. More accurate corrections are possible by obtaining the corrected data before every image input. After completion of the correction processes including the geometric correction and the sensitivity unevenness correction in the image correcting portion 73, the images are input into the image interpolation processing portion 74, where the interpolation process is executed to produce images to be obtained from viewpoints different from those of the two input images. This process will be detailed later. The images output from the image interpolation processing portion 74 are input into the image display portion 75. The image display portion 75 selects two appropriate images as a stereo pair among the input images and displays the two images while alternately switching at high speed. In this case, the observer can watch a stereoscopic image by observing the images using shutter glasses or the like synchronized with the switching. If the image display portion 75 provides alternately different polarization states upon the alternate switching at high speed, the observer can observe a stereoscopic image with polarizing glasses over the left eye and the right eye matching with the polarization states as displayed.

Figure 12:
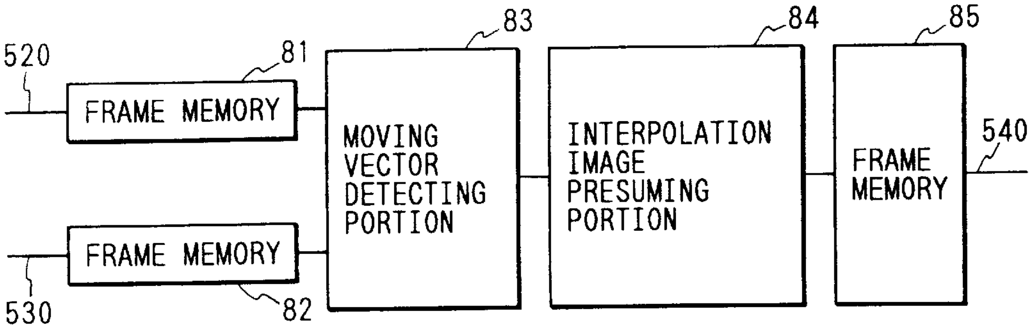
FIG. 12 is a block diagram of an image interpolating portion.

FIG. 12 is a block diagram of the image interpolation processing portion 74.

Figure 13:
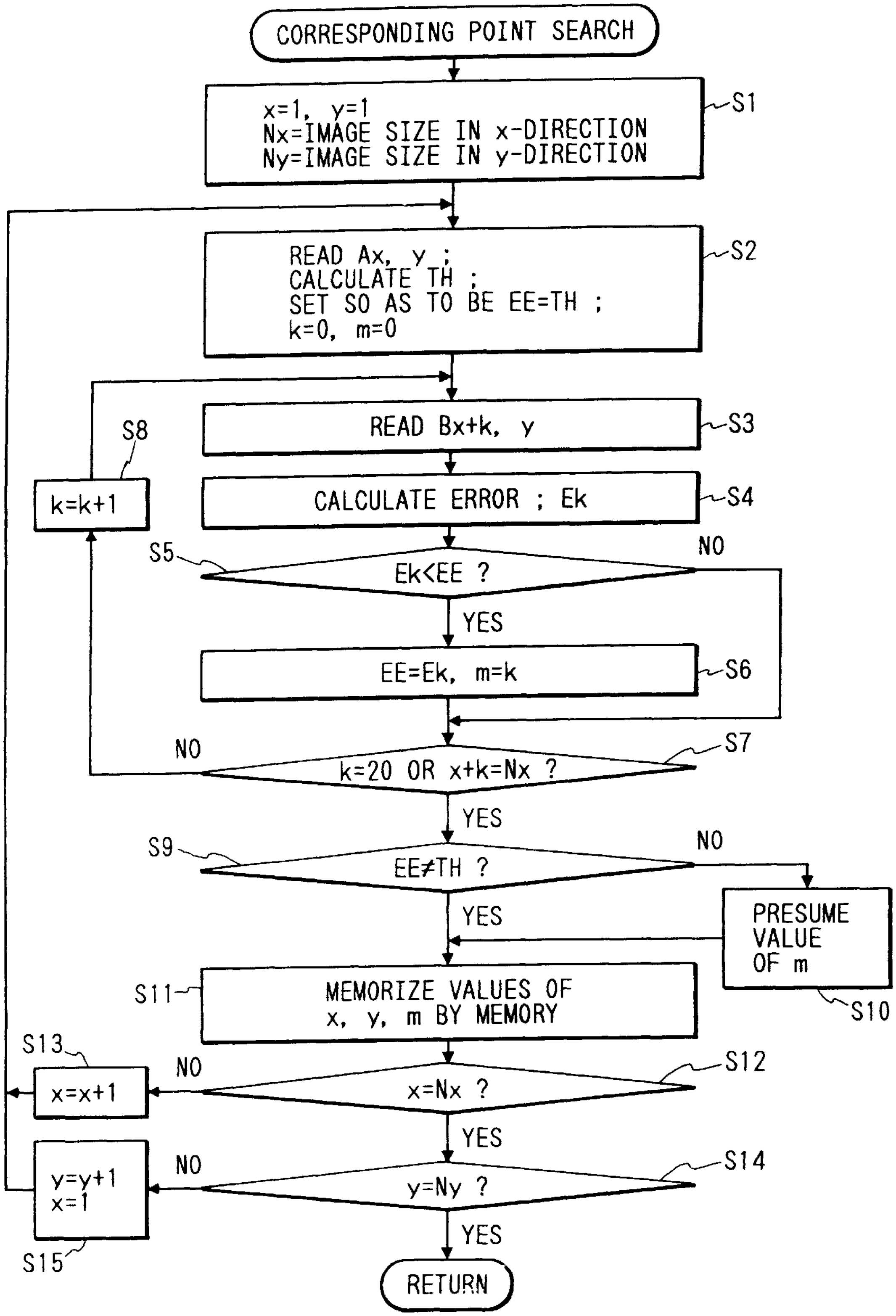
FIG. 13 is a flowchart to show the operation of a motion vector detecting portion.

In FIG. 12, 81 and 82 are frame memories for storing the input images corrected in the image correction processing portion 73, 83 is a motion vector detecting portion for detecting a motion vector from the images stored in the frame memories 81 and 82, 84 an interpolation image presuming portion for obtaining interpolation images using the results of the motion vector detecting portion 83, and 85 a frame memory for storing the presumed interpolation images. First, the input images corrected in the image correction processing portion 73 are stored in the frame memories 81 and 82. Then motion vector detection (corresponding point detection) is carried out in the motion vector detecting portion 83 from the images stored in the frame memories 81 and 82. A flow of the processes is described following the flowchart of FIG. 13.

Figure 14:
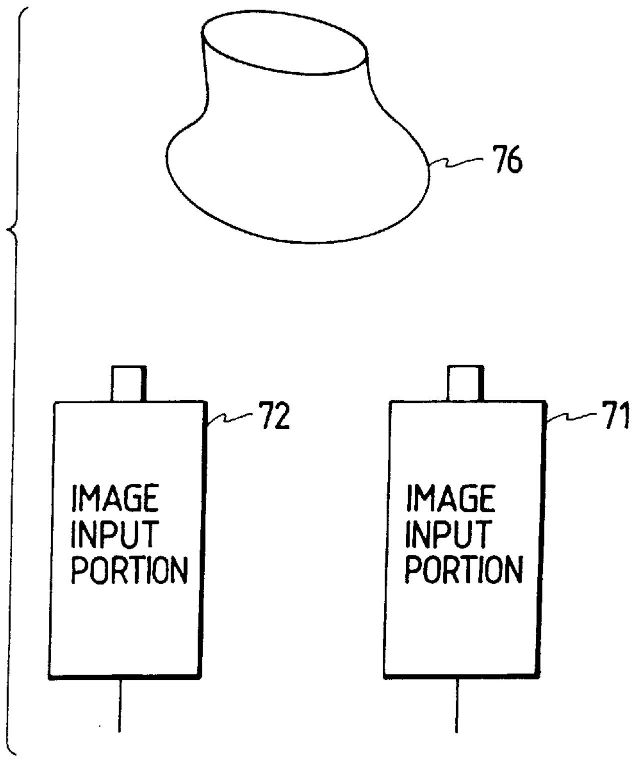
FIG. 14 is a drawing to show a positional relation between an object and cameras.
Figure 15A:
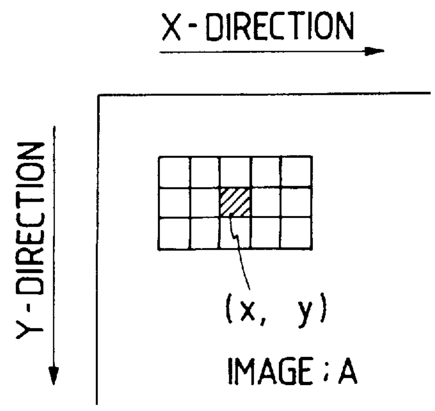
FIGS. 15A and 15B are drawings to illustrate a relation between a pixel of interest and a block in an input image.
Figure 15B:
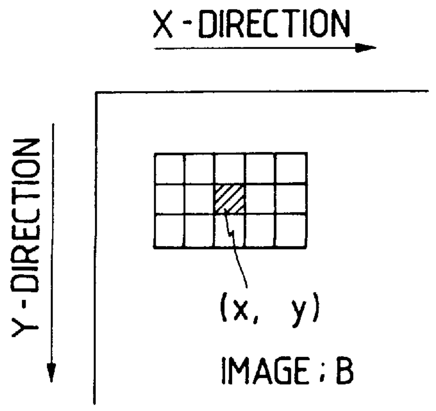

For the initial setting, step S1 sets as x=1, y=1, Nx=x-directional image size, and Ny=y-directional image size. Then at step S2 image data for a block of 5×3 pixels are read around a pixel of interest (x,y) from the frame memory 11 to calculate a threshold value TH, and variables are set as EE=TH, k=0, and m=0. Let Ax, y be image data for the block of 5×3 pixels around (x,y). Here, let us assume that the images stored in the respective frame memories 81 and 82 are as follows. As shown in FIG. 14, let 71 be the right image input portion when the object is observed from the image input portions and 72 be the left image input portion. Then the image data from the image input portion 71 is stored in the frame memory 81 after correction, and the image data from the image input portion 72 is stored in the frame memory 82 after correction. Let image A be the image stored in the frame memory 81, while image B be the image stored in the frame memory 82 (FIGS. 15A and 15B). FIGS. 15A and 15B are drawings to illustrate a relation between a pixel of interest and a block in an input image. The threshold value TH is calculated by 100×(total number of pixels in a block). If a block of 5×3 pixels cannot be taken near the edge of image, the following process is carried out. For example, if a pixel of interest is pixel (1,1) in image A, a block of 5×3 pixels cannot be taken around the pixel (1,1). Then the above process is carried out using a block of six pixels of (1,1), (2,1), (3,1), (1,2), (2,2), (3,2). In this case, TH=600. If a pixel of interest is pixel (2,1) in image A, the above process is executed for a block of nine pixels of (1,1), (2,1), (3,1), (1,2), (2,2), (3,2), (1,3), (2,3), (3,3). In this case, TH=900. If the block for corresponding point search is composed of 5×3 pixels, portions requiring the exceptional process are the cases of x=1, 2, Nx−1, Nx, and y=1, Ny. For these portions, the process can be executed similarly as in the above examples. Although the present embodiment employed the threshold value TH as defined by 100×(total number of pixels in a block), the value is not limited to this, but may be selected as another proper value.

Next at step S3 a block of 5×3 pixels is read around pixel (x+k, y) in image B and, defining it as Bx+k, y, the following calculation is executed (step S4). Here, Ek is defined as an error between Ax, y and Bx+k, y.

$$E_k = \sum_{j=1}^{3} \sum_{i=1}^{5} \{A_{x,y}(i, j) - B_{x+k,y}(i, j)\}^2$$

In the formula, Ax, y (i,j) and Bx+k (i,j) are values of pixels with pixel position of (i,j) in Ax, y and Bx+k, y, respectively, and k is an integer of from 0 to N, where N is a value determined by the intervals of the cameras and the distance between the cameras and an object. For example, fixing the intervals of the cameras, N increases as the distance between the cameras and the object becomes shorter. Conversely, it decreases as the distance becomes longer. Here, the camera intervals and the distance between the object and the cameras are adjusted to meet N=20. Namely, the following description is given under the assumption that the cameras can take images of an object apart more than a certain distance therefrom.

At step S5, the variable Ek is compared with the variable EE. If the variable Ek is smaller, the flow proceeds to step S6; if not the flow goes to step S7. At step S6 EE=Ek and m=k are set. At step S7 it is judged whether the search is conducted throughout the search region k=0 to 20 or whether the search is conducted up to the right end of image. If the search is not completed, the value of k is increased by "1" at step S8 then to return to step S3. If the search is completed, the flow moves to step S9 to judge if the value of EE is coincident with TH. If EE=TH, a decision is made that there is no point on image B corresponding to (x,y) in image A. If EE=Ek, a decision is made that a point corresponding to (x,y) in image A is (x+k, y) in image B. If there are several corresponding Ek's, one with smallest k is employed. If the value of EE coincides with TH, the flow goes to step S10 to presume the value of m from m's of neighboring pixels. The presuming method may be, for example, a method for taking an average value of m's of neighboring pixels or a method for taking a value of most frequently appearing m. Unless EE coincides with TH, the flow moves to step S11 to store the values of x, y, and m on the working memory not shown. Then the flow moves to step S12 to judge if the process is executed up to the final pixel in the x-direction. Unless the process is through, the value of x is increased by "1" at step S13, and then the flow returns to step S2. After the process is conducted up to the final pixel in the x-direction, the flow goes to step S14 to judge if the process is conducted up to the final line in the y-direction. Unless the process is through, the value of y is increased by "1" at step S15, and the value of x is set to "1", returning to step S2. If the process is through up to the final line in the y-direction, the process of corresponding point search is ended. For each of nineteen right-end pixels in image A, twenty pixels cannot be secured for the search region (region of the value taken by k) in image B. In that case, the process is carried out within a range possible to be taken. If a corresponding point cannot be detected within the search possible region, a corresponding point is determined with an average value of neighboring corresponding points (motion vectors) (provided that only an average value in the x-direction is used) or with a most frequently appearing value (the above m) among the neighboring points.

Figure 16A:
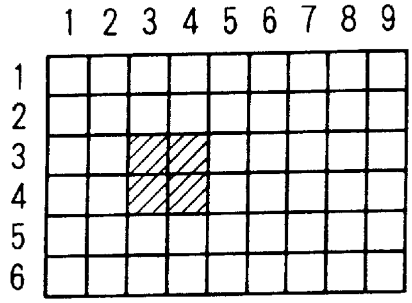
FIGS. 16A and 16B are drawings to illustrate the operation of an interpolation image presuming portion.
Figure 16B:
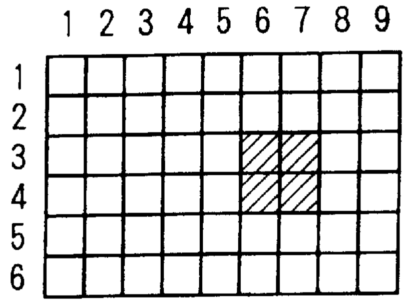

The interpolation image presuming portion 84 interpolates images observed from arbitrary viewpoints in accordance with the results of the motion vector detecting portion 83. The method of the interpolation is next described. FIGS. 16A, 16B to FIG. 19 are drawings to illustrate the operation of the interpolation image presuming portion 84. FIGS. 16A and 16B indicate corrected images obtained from the image input portions 71 and 72. (In FIGS. 16A, 16B, a luminance value of white portions in the images represents 255 while that of hatched portions 100.) Table 1 shows the results of motion vector detection effected on the images.

TABLE 1

| A | B |
|---|---|
| (2,3) | (5,3) |
| (3,3) | (6,3) |
| (4,3) | (7,3) |
| (5,3) | (8,3) |
| (2,4) | (5,4) |
| (3,4) | (6,4) |
| (4,4) | (7,4) |
| (5,4) | (8,4) |

Figure 17:
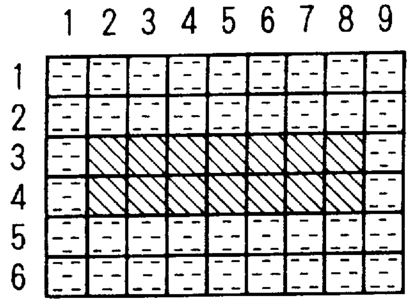
FIG. 17 is a drawing to illustrate the operation of the interpolation image presuming portion.

To simplify the description, the block of 5×3 pixels as described for the motion vector detecting portion 83 is changed into a block of 3×1 pixels. Pixels not listed in Table 1 have no motion. The area in image A in the table (Table 1) is first searched to extract points without motion and to copy the points in the frame memory 85. FIG. 17 shows the results.

Figure 18:
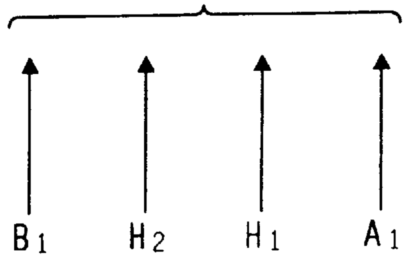
FIG. 18 is a drawing to illustrate the operation of the interpolation image presuming portion.

In FIG. 17 the dashed portions are points extracted as the points without motion. Luminance values of the dashed portions are the same as those of points of the same coordinates in image A. Then interpolation is executed for the points recorded in the table (Table 1). Here, images are interpolated as observed from two viewpoints obtained by trisecting the interval between the visual axes of image A and image B. FIG. 18 shows this situation. In FIG. 18, A1 and B1 represent positions (optical axes) of the cameras which took the images A and B, respectively, and H1 and H2 positions (optical axes) of virtual cameras assumed to take respective interpolation images. If an image observed from the position of H1 is interpolated, a point in image A is defined as a while a point in image B corresponding thereto as b. Defining a point internally dividing a distance between the point a and the point b at a ratio of 1:2 as c, a luminance value of the point c is set equal to that of the point a. Although the luminance of the point c is set equal to that of the point a in this example, the luminance value of c may be determined according to the proportion of the internal division if the luminance values of the point a and the point b are different from each other. For example, the luminance value may be determined by c'=(R1·b'+R2·a')/(R1+R2). Here, a', b', c' represent luminance values of a, b, c, respectively, and R1, R2 elements of the proportion when the distance between the point a and the point b is internally divided at R1:R2.

Figure 19:
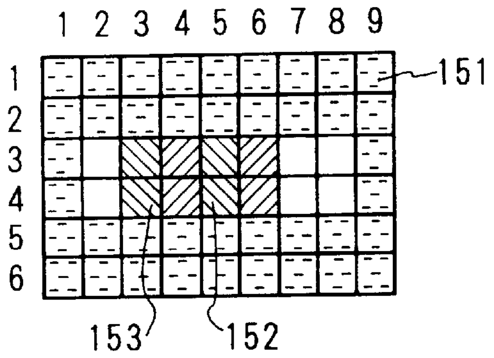
FIG. 19 is a drawing to illustrate the operation of the interpolation image presuming portion.

This operation is carried out for all points in the table (Table 1). The results of the process are stored in the frame memory 85. FIG. 19 shows the results. An image 151 of the dashed portions in FIG. 19 is a set of points without motion, an image 152 (of luminance value 100) of first hatched portions and an image 153 (luminance value 255) of second hatched portions are respective sets of points obtained by the inner division. Interpolation is next carried out for white portions in FIG. 19. The white portions are portions where the background is exposed because of a motion of the object. Then points with the same coordinates as the white points are checked among the points in image A and image B in FIG. 16, and points without motion are employed as interpolated points to be stored in the frame memory 85. For example, among the points with the same coordinates as the white points (2,3) and (2,4) in FIG. 19, points without motion are points (2,3) and (2,4) in image B, so that luminance values of the points are employed for those of points (2,3) and (2,4) in an interpolated image. Further, because points without motion having the same coordinates as the points (7,3), (7,4), (8,3), (8,4) in the interpolated image are points (7,3), (7,4), (8,3), (8,4) in image A, luminance values for the points (7,3), (7,4), (8,3), (8,4) in the interpolated image are determined as those of the points (7,3), (7,4), (8,3), (8,4) in image A, respectively. The above processes provide the interpolated image observed from the virtual viewpoint H1 in FIG. 18. An interpolated image observed from another virtual viewpoint H2 can also be attained by the same processes.

In display, stereoscopic images observed from a plurality of viewpoints can be displayed by properly combining images obtained from the image input portions 71, 72 and the images obtained by the interpolation.

According to the processes in the above arrangement, an image obtained using a small number of image input devices can be equivalent to one obtained using a multitude of image input devices. For example, a stereoscopic image can be observed while changing the viewpoint with images from two cameras. Since the image input portions can be constructed in a compact scale, the total structure of the apparatus can be made smaller thereby.

In the motion vector detecting portion 83, the used mask (block of 5×3 pixels) can be weighted, which can respond to corresponding point search of locally changing portions. The method of assigning weights may be a method for differentiating a weight for a line including a pixel of interest from a weight for another line or a method for assigning a decreased weight to a line more distant from the pixel of interest. Also, the size of the mask used can be changed depending upon the type of image, for example a small mask for a complicated image while a large mask for a simple image, thus improving the accuracy of corresponding point search.

The image interpolation processing portion 84 was described with the processing method under the assumption of the frame memories, but it is apparent that this process can be sequentially performed in the pixel unit. Further, the motion vector search (corresponding point search) and the interpolation process can be processed in parallel, and, therefore, the processing speed can be improved by the hardware construction for simultaneously processing a plurality of lines.

Figure 20:
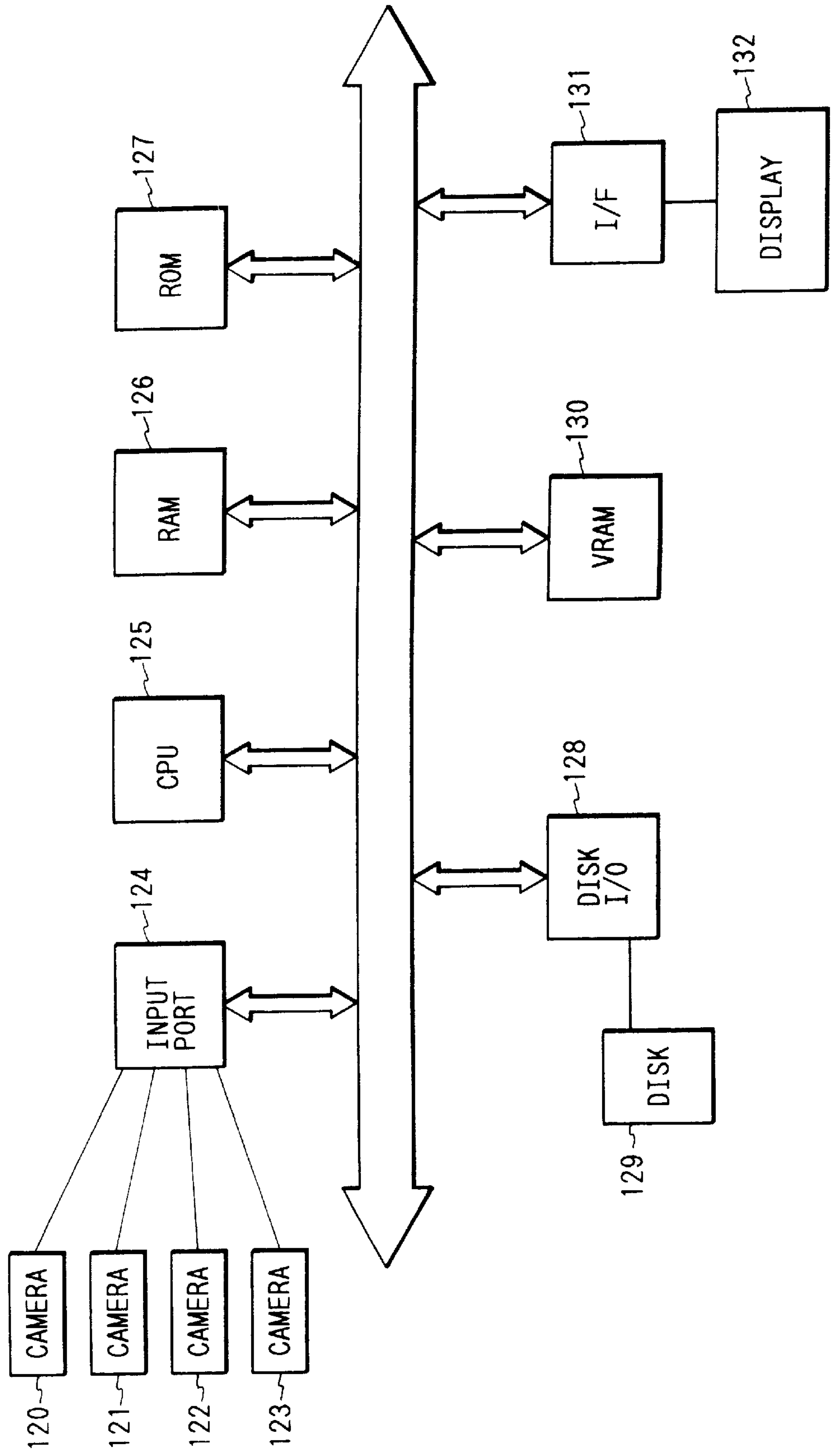
FIG. 20 is a block diagram of another embodiment of the present invention.

If there are three or more cameras as the image input means, the accuracy of corresponding point search (motion vector detection) can be improved. FIG. 20 is a block diagram of an embodiment in which four cameras are used as image input portions. In FIG. 20, 120 to 123 are cameras as image input portions, 124 an input port, 125 a CPU, 126 a RAM, 127 a ROM, 128 a disk I/O port, 129 a hard disk, 130 a VRAM, 131 a video signal output I/F, and 132 a lenticular display. The cameras 120 to 123 are of the same type as the image input portions 71, 72 in FIG. 11. Although the description concerns the embodiment with four cameras 120 to 123, the number of cameras is by no means limited to four but may be arbitrary.

Figure 21:
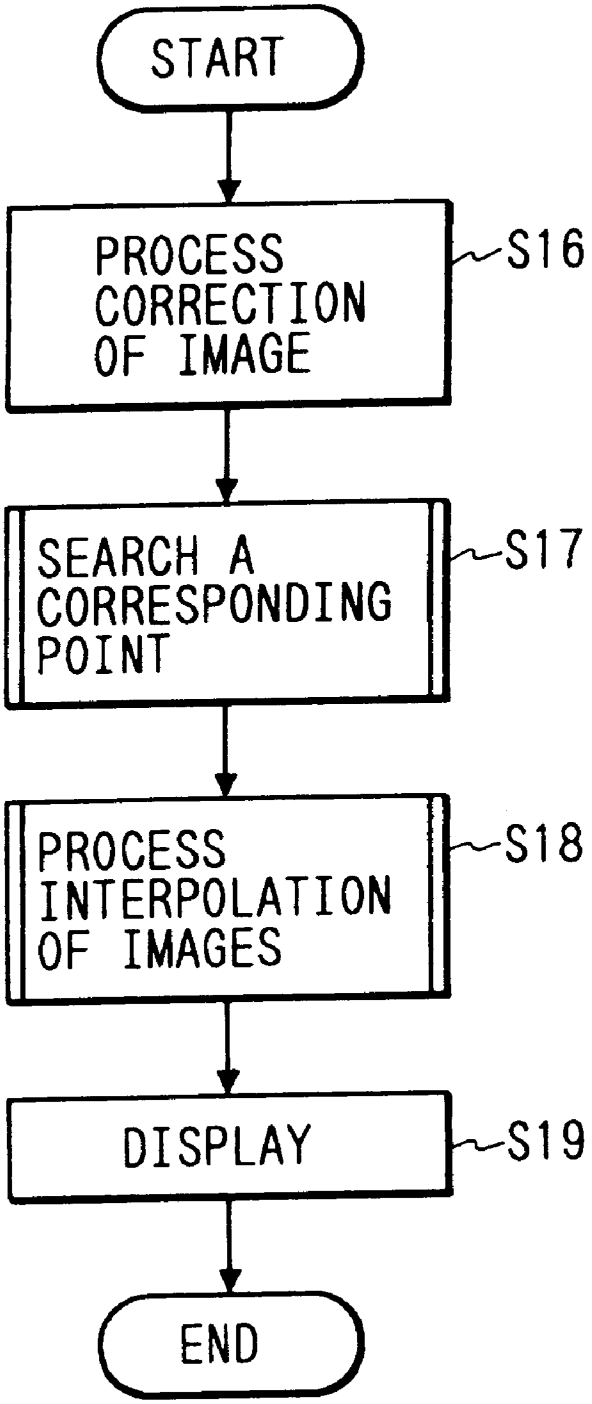
FIG. 21 is a flowchart to show a flow of the process in the embodiment of FIG. 20.

FIG. 21 is a flowchart to show a flow of processes in the embodiment of FIG. 20. At step S16 original images from the image input devices such as cameras are first subjected to the same processes as those in the image correction processing portion 72 (FIG. 11), which are the geometric correction processes for correcting the chromatic aberrations and distortions of lenses, a deviation of the optical axis, and the posture and position of cameras, and the correction process including the correction of sensitivity unevenness of CCD sensors. Preliminarily recording the correction data after calibration in ROM or RAM, the correction processes can be performed at high speed referring to a table of the correction data. Further, more accurate corrections become possible by obtaining the correction data before every image input. After completion of the correction processes, the flow moves to step S17 to perform corresponding point search (motion vector detection) between the images. After completion of the corresponding point search, the flow then moves to step S18 to perform interpolation of images, and at step S19 the corrected input images and the interpolated images are displayed on the lenticular display. The corresponding point search process at step S17 is the same as the corresponding point search process at step 52 in FIG. 5 as described with FIG. 6 to FIG. 10.

Next described is an example in which the display screen 1 (FIG. 1) is an image display device of the so-called head-mounted display (HMD) type to be set on the user's head. An image processing apparatus of the present embodiment is so arranged that the process in the visual-axis parameter calculating portion 10 in the image processing apparatus is modified as follows so as to match with HMD. The following description is focused on a case not taking the vertical parallax into consideration.

Figure 22:
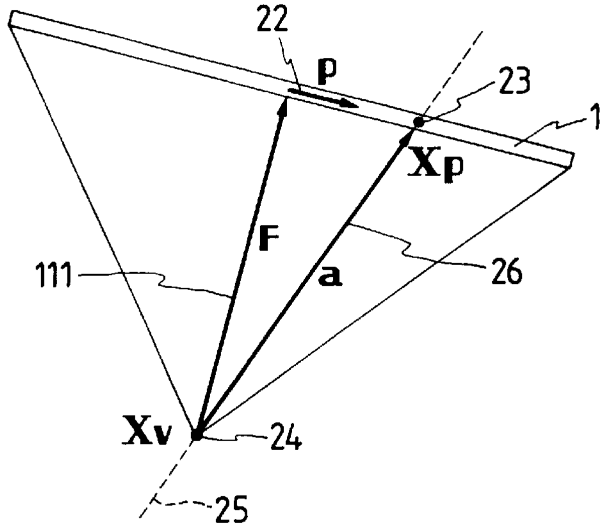
FIG. 22 is a drawing to show the principle of calculation of a visual-axis parameter.

FIG. 22 is a drawing to show the principle of calculation of the visual-axis parameter calculating portion 10 in the present embodiment. In FIG. 22, a vector 22 is a display screen vector p, which is a vector with the length being the pixel pitch of display screen 1 and the direction being an inclination of display screen 1. Further, let Xp and Xv be position vectors of a pixel position 23 of a pixel of interest and a viewpoint position 24 of the user's viewpoint, respectively. A vector 111 is a front vector F, which is a vector from the viewpoint position 24 to the center point of the display screen 1. A vector 26 is a visual-axis vector a indicating an inclination of the line of sight 25 directed to the pixel position 23 of the pixel of interest.

In the display device of the HMD type a viewpoint detector 2 is incorporated, so that an inclination of the front direction, which is the inclination of the front vector 111, can be detected thereby in addition to the position of the user's viewpoint 24. The inclination of display screen vector 22 is determined from the inclination of the front vector 111 (which is normally 90°). The distance from the viewpoint position 24 to the display screen 1, i.e., the length of the front vector 111, and the pixel pitch, i.e., the length of the display screen vector 22, are fixed values determined by the shape of HMD, which are held in the display parameter holding portion 4. Accordingly, the pixel position 23 of the pixel of interest and the visual-axis vector 26 can be calculated by the following formulas. Here, the pixel index 9 is i.

$$Xp=Xv+F+i\cdot p$$

$$a=Xp-Xv$$

The above arrangement permits the display device of the HMD type to display an image for an arbitrarily moving viewpoint out of the images in the multi-viewpoint image database. The display screen 1 does not necessarily have to be fixed on the head. For example, a display device of a cockpit type, in which a relative position relation between a fixedly set display screen 1 and the user's viewpoint position 24 is kept fixed, can be also used. An image processing apparatus using the display device of the cockpit type can display an image for an arbitrarily moving viewpoint, employing the same process as that of the viewpoint parameter calculating portion 10 in the present embodiment. In that case the viewpoint detector 2 should be replaced by a viewpoint position input device in which the viewpoint position 24 at reference coordinates is manipulated through a handle.

The above embodiments were so arranged that the viewpoints of the images held in the multi-viewpoint image database 3 were set on a plane, but the present invention is by no means limited to the arrangement. For example, a possible arrangement is such that the viewpoints are arranged on a cylindrical surface at sufficiently fine intervals and images are taken from points on the cylindrical surface towards inside (images of full-circumference type). The next embodiment is directed to the images of the full-circumference type.

Figure 23:
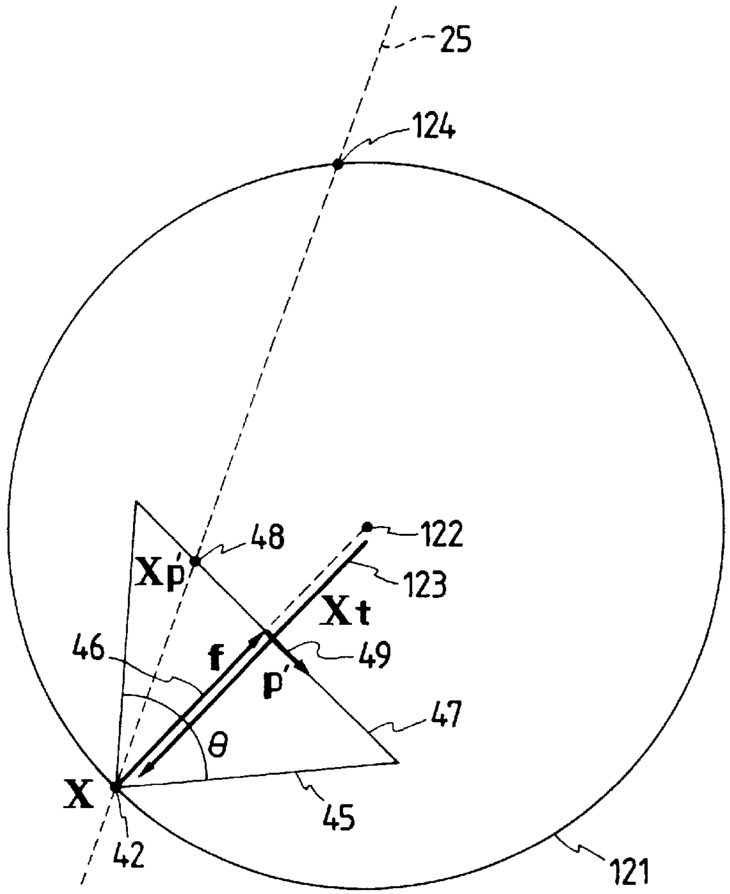
FIG. 23 is a drawing to show the principle of calculation of a virtual viewpoint parameter and a pixel position.
Figure 24A:
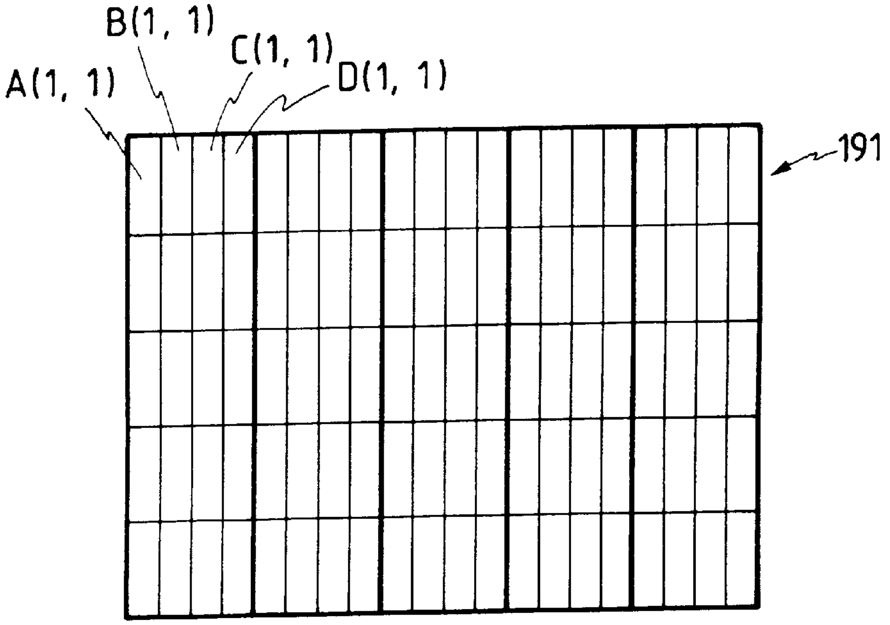
FIGS. 24A and 24B are schematic, perspective views to show a conventional lenticular display.
Figure 24B:
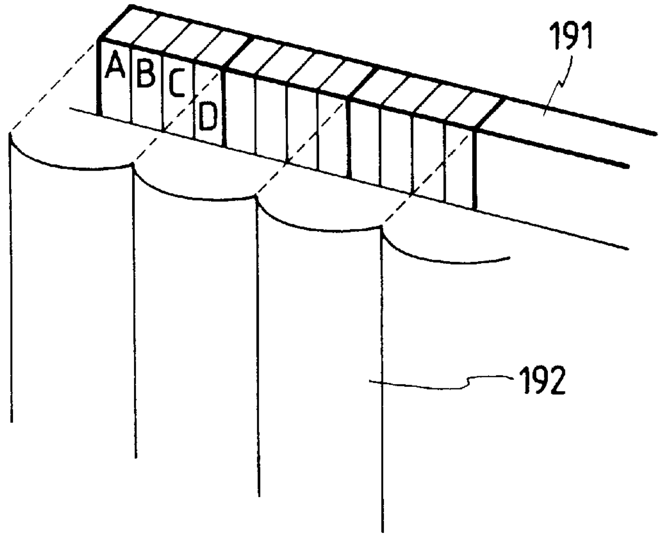

The present embodiment is so arranged that the processes of the virtual viewpoint parameter calculating portion 11 and the pixel position calculating portion 12 in FIG. 1 are replaced by processes as described below. The following description concerns a case where the vertical parallax is omitted. FIG. 23 is a drawing to show the principle of calculation of a virtual viewpoint parameter and a pixel position.

Let us define a viewpoint arrangement circle 121 as a cross section of a circular cylinder on which viewpoints were arranged when the images constituting the multi-viewpoint image database 3 were taken. An intersection between a line of sight 25 and a viewpoint arrangement circle 124 is a virtual viewpoint 42, a position vector of which is a virtual viewpoint position vector X. Let Xc be a position vector of the center 122 of the viewpoint arrangement circle 121, and a virtual viewpoint vector Xt be a vector 123 from the center 122 to the virtual viewpoint 42. Further, define a visual field 45 of field angle e at the virtual viewpoint 42. A vector 46 is a focus vector f, which is a vector with the length being a focal length of a camera taking an image and the direction being an inclination of the camera. Considering a virtual image pickup plane 47 at the virtual viewpoint 42, a pixel position 48 is determined as an intersection between the virtual image pickup plane 47 and the line of sight 25. A position vector of the pixel position 48 is Xp'. A vector 49 is an image pickup plane vector p', which is a vector with the length being one pixel pitch of the virtual image pickup plane 47 and the direction being an inclination of the virtual image pickup plane 47 (normally perpendicular to the focus vector 46). Because of the full circumference type, there are two intersections between the circle 121 and the line of sight 25. So the intersection other than the virtual viewpoint 42 is called a false virtual viewpoint 124.

In this case, the center 122 and the radius R of the viewpoint arrangement circle 121 are stored as values representing the photo-taking viewpoint coordinate system in the photo-taking viewpoint coordinate system holding portion 5. A virtual viewpoint vector 123 can be defined as follows with a parameter t uniquely expressing the virtual viewpoint 42.

$$Xt=(R\cdot\cos(t),\ R\cdot\sin(t))$$

Also, the focus vector 46 and image pickup plane vector 49 are held as the multi-viewpoint image parameter in the multi-viewpoint image parameter holding portion 6. The magnitude of the image pickup plane vector 49 is determined by the real size and the pixel size of the image pickup plane.

The calculation process of the virtual viewpoint parameter is next described. According to the geometry shown in FIG. 23, the virtual viewpoint 42 can be expressed by the following two formulas.

$$X=Xc+Xt$$

$$X=Xv+\alpha\cdot a$$

Here, α is a coefficient in the direction of the line of sight. The parameter t is calculated by solving the two formulas. On this occasion the solutions are evaluated to satisfy the following condition in order to discriminate the false virtual viewpoint 124 from the correct virtual viewpoint 42.

$$Xt\cdot a<0$$

Then the pixel position can be calculated in the same manner as in the embodiment of FIG. 1, taking the arrangement shown in FIG. 23 into consideration. The above arrangement can provide an image processing apparatus utilizing the images of the full circumference type, which permits arbitrary viewpoint movement of the full circumference type. Using this image processing apparatus, the observer can watch a photo-taken object along any direction of 360° and at any distance.

The embodiment of FIG. 1 was so arranged that the preliminarily taken images were held in the multi-viewpoint image database 3. This can be replaced by a multi-eye television camera which can capture images from multiple viewpoints in real time, achieving an arbitrary viewpoint image display system of real time.

The present invention can be applied to the image processing apparatus alone, to system equipment such as a multi-viewpoint television, a multi-viewpoint video telephone terminal, or a multi-viewpoint video conference system, or to a composite device in combination with a computer or another image processing apparatus.

The holography can be employed as the method for stereoscopically displaying an image in the above embodiments. This is a technique for displaying a stereoscopic image in such a manner that laser light (reference light) is applied to object light of an object to produce interference fringes and the reference light is again applied to the interference fringes to form a stereoscopic image. If the application of laser light is not suitable, or if the object is too big, the technique of holographic stereogram can be employed. This technique is a method for obtaining a stereoscopic image in such a manner that a multitude of photographs are taken changing the viewpoint bit by bit, the photographs are projected onto a transmission diffusion plate, the reference light is applied to the projected plane to produce interference fringes, the produced interference fringes are cut out to synthesize an interference fringe pattern, and the reference light is applied to the interference fringe pattern, thus attaining a stereoscopic image. The details of the holographic stereogram are described in Junpei, TSUJIUCHI; *Holographic Display*, PP191–207 (Sangyo Tosho).

The technique of the holographic stereogram needs a lot of images taken changing the viewpoint bit by bit, and, therefore, requires many cameras. The technique of moving a single camera bit by bit can be employed in case of a still image, but a number of cameras must be inevitably used in case of a dynamic image. This problem can be solved by employing the interpolation images of the present invention. Namely, using images obtained from some to some ten cameras as the input images, images to be obtained from viewpoints between cameras are produced by the interpolation of the present invention. The use of this method has an advantage that a decreased number of cameras can be used. Considering a television using the holographic stereogram, an advantage of data compression can be enjoyed if some to some ten images are transmitted and interpolation images are produced on the receiver side. If the technique of image compression is also employed in transmitting the input images, the data can be further compressed.

What is claimed is:

1. An image processing method comprising:

a data generating step of generating images of an object obtained from a plurality of positions and for converting the images so generated into image data;

a viewpoint detecting step of detecting the viewpoint of an observer;

a selecting step of selecting those parts of the image data which corresponds to the images which exist on lines passing through points on an image outputting device and the position of the viewpoint of the observer;

a composing step for composing the parts of the image data which are selected in said selecting step, so as to generate an image from the position of the viewpoint of the observer; and an outputting step for outputting the image data of the image generated in said composing step to said image outputting device, wherein the selecting step does not rely on coordinate values in a three-dimensional space for points on the image.

2. A method according to claim 1, wherein said data generating step includes obtaining images from a database storing images already taken by a camera from a plurality of directions.

3. A method according to claim 2, wherein said images are obtained from more than one camera.

4. A method according to claim 1, wherein said data generating step comprises performing an interpolation process for a plurality of images photo-taken by at least one camera to produce images from positions of viewpoints different from the positions where the images were taken by said camera.

5. A method according to claim 1, further comprising an inter-viewpoint interpolation processing step of performing an interpolation process on stored image data to produce new images and adding said new images to the image data.

6. A method according to claim 1, wherein said viewpoint detecting step includes a step for detecting the direction of the line of sight of said observer as well as the position of the eyes of the observer.

7. A method according to claim 1, wherein said composing step includes:

calculating a parameter necessary for reconstruction of an image from the position of the eyes of the observer and the type of the image outputting device;

calculating to which pixel in said input images each pixel in an image to be reconstructed corresponds, using said parameter; and extracting corresponding pixels from said input images to reconstruct an image.

8. A method according to claim 1, wherein said image data is output to a stereo display.

9. A method according to claim 1, wherein said image outputting device includes a head-mounted display.

10. A method according to claim 1, wherein said image outputting device includes a lenticular display.

11. An image processing method according to claim 1, wherein the position of said image outputting device is determined on the basis of the position of the viewpoint of the observer and a direction of the line of sight of the observer.

12. Image processing apparatus comprising:

means for generating images of an object obtained from a plurality of positions and for converting the images so generated into image data; and means for detecting the viewpoint of an observer;

and characterized by calculating means adapted to select those parts of the image data which corresponds to the images which exist on lines passing through points on an image outputting device and the position of the viewpoint of the observer as detected;

and for composing the parts of the image data which have been so selected, so as to generate an image from the position of the viewpoint of the observer, wherein the calculating means does not rely on coordinate values in a three-dimensional space for points on the image.

13. Apparatus according to claim 12, wherein said calculating means are adapted to obtain images from a database storing images already taken by a camera from a plurality of directions.

14. Apparatus according to claim 13, wherein said images have been obtained from more than one camera.

15. Apparatus according to claim 12, wherein said calculating means is adapted to perform an interpolation process for a plurality of images photo-taken by at least one camera to produce images from positions of viewpoints different from the positions where the images were taken by said camera.

16. Apparatus according to claim 12, wherein said calculating means are adapted to perform an inter-viewpoint interpolation process on stored image data to produce new images and to add said new images to said image data.

17. Apparatus according to claim 12, wherein said viewpoint detecting means are adapted to detect the position of the eyes of the observer as well as the direction of the line of sight of said observer.

18. Apparatus according to claim 12, wherein calculating means are adapted to calculate a parameter necessary for reconstruction of an image from the position of the eyes of the observer and the type of the image outputting device;

calculating to which pixel in said input images each pixel in an image to be reconstructed corresponds, using said parameter; and extracting corresponding pixels from said input images to reconstruct the image to be output to the observer.

19. Apparatus according to claim 12, including a stereo display to which the generated image data is output.

20. Apparatus according to claim 12, wherein said image outputting device includes a head-mounted display.

21. Apparatus according to claim 12, wherein said image outputting device comprises a lenticular display.

22. Apparatus according to claim 12, including means for determining the position of said image outputting device on the basis of the position of the viewpoint of the observer and the direction of the line of sight of the observer.

* * * * *

UNITED STATES PATENT AND TRADEMARK OFFICE

CERTIFICATE OF CORRECTION

PATENT NO. : 6,191,808 B1 
DATED : February 20, 2001
INVENTOR(S) : Akihiro Katayama et al.

It is certified that error appears in the above-identified patent and that said Letters Patent is hereby corrected as shown below:

Column 6,
Line 63, "by i." should read -- by i. --

Column 7,
Line 30, "view e" should read -- view $\theta$ --
Line 67, equation (6), "$Xp=X+\beta\bullet a$" should read -- $Xp'=X+\beta\bullet a$ --

Column 14,
Lines 37-44, "defined as a while a point in image B corresponding thereto as b. Defining a point internally dividing a distance between the point a and the point b at a ratio of 1:2 as c, a luminance value of the point c is set equal to that of the point a. Although the luminance of the point c is set equal to that of the point a in this example, the luminance value of c may be determined according to the proportion of the internal division if the luminance values of the point a and the point b are" should read -- defined as a while a point in image B corresponding thereto as b. Defining a point internally dividing a distance between the point a and the point b at a ratio of 1:2 as c, a luminance value of the point c is set equal to that of the point a. Although the luminance of the point c is set equal to that of the point a in this example, the luminance value of c may be determined according to the proportion of the internal division if the luminance values of the point a and the point b are --
Line 49, "point a and the point b" should read -- point a and the point b --

Column 16,
Line 51, "is i." should read -- is i. --

Column 17,
Line 33, "angle e" should read -- angle $\theta$ --

Signed and Sealed this

Sixth Day of August, 2002

*Attest:*

JAMES E. ROGAN

*Attesting Officer* *Director of the United States Patent and Trademark Office*